(12) United States Patent
Wang et al.

(10) Patent No.: US 8,767,799 B2
(45) Date of Patent: Jul. 1, 2014

(54) METHOD AND APPARATUS FOR DETERMINING SIGNAL-TO-NOISE RATIO

(75) Inventors: Jerry Wang, Bethlehem, PA (US); Kumud Sanwal, Edison, NJ (US); Jonqyin Sun, Randolph, NJ (US); Kai Xie, North Brunswick, NJ (US); Susan M. Miller, Whitehouse Station, NJ (US); Marc E. Shelton, Somerset, NJ (US)

(73) Assignee: Alcatel Lucent, Paris (FR)

( * ) Notice: Subject to any disclaimer, the term of this patent is extended or adjusted under 35 U.S.C. 154(b) by 422 days.

(21) Appl. No.: 13/084,690

(22) Filed: Apr. 12, 2011

(65) Prior Publication Data

US 2012/0263221 A1   Oct. 18, 2012

(51) Int. Cl.
*H04B 1/00* (2006.01)

(52) U.S. Cl.
USPC ............ 375/148; 375/136; 375/147; 375/145

(58) Field of Classification Search
USPC .......................... 375/148, 136, 147, 149, 145
See application file for complete search history.

(56) References Cited

U.S. PATENT DOCUMENTS

| | | | |
|---|---|---|---|
| 7,782,820 B2 | 8/2010 | Dominique et al. | |
| 2002/0101832 A1* | 8/2002 | Chen et al. | 370/318 |
| 2002/0136278 A1 | 9/2002 | Nakamura et al. | |
| 2002/0196879 A1 | 12/2002 | Iochi | |
| 2003/0142730 A1 | 7/2003 | Lin | |
| 2004/0057502 A1 | 3/2004 | Azenkot et al. | |
| 2004/0091034 A1 | 5/2004 | Shiu et al. | |
| 2005/0128985 A1 | 6/2005 | Liberti et al. | |
| 2005/0207475 A1 | 9/2005 | Bar-Ness et al. | |
| 2008/0075046 A1 | 3/2008 | Dominique et al. | |
| 2008/0130731 A1 | 6/2008 | Shiu et al. | |
| 2009/0323777 A1 | 12/2009 | Wang et al. | |
| 2010/0260231 A1 | 10/2010 | Ringstom et al. | |
| 2011/0158293 A1 | 6/2011 | Shiu et al. | |
| 2011/0244893 A1 | 10/2011 | Wang et al. | |
| 2012/0258763 A1 | 10/2012 | Bjorkegren et al. | |

FOREIGN PATENT DOCUMENTS

| | | | |
|---|---|---|---|
| WO | WO-2004/045096 A2 | 5/2004 | |
| WO | WO 2008/057018 A1 | 5/2008 | |

OTHER PUBLICATIONS

PCT/ISA/220 dated Jul. 2, 2012 for PCT/US2012/032854.
PCT/ISA/237 for PCT/US2012/032854.
Won et al. "An Unbiased Signal-to-Interference Ratio Estimator for the High Speed Downlink Packet Access System". ETRI Journal, vol. 25, No. 5. pp. 418-421. Oct. 2003.
International Search Report and Written Opinion dated Jun. 27, 2012 for International Application No. PCT/US2012/032850.
U.S Office Action for U.S. Appl. No. 13/084,901 dated Mar. 13, 2013.
U.S. Office Action for U.S. Appl. No. 13/084,901 dated Aug. 28, 2013.

* cited by examiner

*Primary Examiner* — Kabir A Timory
(74) *Attorney, Agent, or Firm* — Harness, Dickey & Pierce, P.L.C.

(57) ABSTRACT

In one embodiment, the method includes despreading the received signals by applying an unused channelization code, determining noise power based on output of the despreading, and determining a signal-to-noise ratio, SIR, based on the noise power and at least one of the received signals.

11 Claims, 3 Drawing Sheets

METHOD AND APPARATUS FOR DETERMINING SIGNAL-TO-NOISE RATIO

BACKGROUND OF THE INVENTION

A Wideband Code Division Multiple Access (WCDMA) system provides that a user equipment sends multiple control channels and data channels. These channels are made orthogonal to each other through the use of channelization codes. Therefore, these channels may be transmitted simultaneously, and a receiver can separate them using the different channelization codes.

However, in a multipath scenario, any two channels from different fingers (multipaths) are no longer orthogonal because their arrival timing at the receiver is mismatched due to the latency between the two fingers. Therefore, while a receiver separates a current channel from other channels in the same finger using the associated channelization code, the channels from other fingers may leak into the current channel. This leakage is called cross-finger interference. The energy of the cross-finger interference is the original energy in the other finger reduced by a despreading factor determined by the symbol size of the channelization code in the current finger of the receiver.

FIG. 1 illustrates a channel model for a Wideband Code Division Multiple Access (WCDMA) system. Here, a user equipment (UE) has multiple concurrent channels, such as Sc(t) for a control channel signal (e.g., a Dedicated Physical Control Channel or DPCCH in WCDMA) and Sd(t) for a data channel signal (e.g., E-DCH Dedicated Physical Data Control Channel or E-DPDCH in WCDMA). While the UE may send many concurrent channels, only two channels are shown for the sake of brevity and simplicity of disclosure. In particular, the UE applies respective orthogonal codes at spreaders 10, 12 for each signal, and a transmitter 14 transmits the multiple signals over a medium such as an air interface. Noise n(t) is an additive channel noise added by transmission over the medium. A base station or NodeB therefore receives the following waveform at its receiver 20:

$$x(t)=Sc(t)+Sd(t)+n(t)$$

In this example, if the control signal and the data signal come from different fingers (or multi-paths), then power of one signal may leak into the power of another signal causing cross-finger interference. This interference significantly impacts receiver performance, particularly when determining a signal-to-noise ratio (SIR) and the operations such as uplink power control which rely on the SIR determination.

To better understand this impact, uplink power control will be briefly discussed. As is well-known, during uplink power control according to WCDMA, a NodeB and UE establish a power control loop only based on the DPCCH. The NodeB measures the SIR (DPCCH Sc(t) power to n(t) noise power ratio) and compares the measured SIR to a target SIR. The NodeB instructs the UE to adjust the uplink DPCCH power level to meet the desired SIR range and a desired bit error rate (BER) performance received, for example, from a radio network controller (RNC). After this power control closed loop is established, the UE will generate a DPCCH uplink transmission gain factor βc for the DPCCH channel. The UE uses the gain factor βc as a base to calculate the transmission power for the other uplink channels. For example, for the E-DPDCH channel, a desired power ratio is defined by TPR=(E-DPDCH power)/(DPCCH power). The E-DPDCH transmission power gain factor βed is then determined according to the following expression:

$$\beta ed^2 = TPR \cdot \beta c^2$$

In this approach, the closed loop power control should not include E-DPDCH signal power. Any interference leaked from the E-DPDCH into the DPCCH will cause the DPCCH SIR measurement to have an offset and result in misleading the power control loop. If the cross-finger interference is too strong, the problem is that the power control loop diverges and can not set a correct power gain factor for each channel.

The cross-finger interference could be very strong and significantly impact system performance. For example, in WCDMA system, E-DPDCH power may be 100s of times stronger than the DPCCH. For the DPCCH, the cross-finger interference from the E-DPDCH could be even stronger than DPCCH itself. For additive channel noise power estimation, the cross-finger interference could cause a huge offset for the noise power estimation. This cross-finger interference may cause a NodeB to miss-measure the SIR and lead to power diverge in uplink power control loop.

Furthermore, existing techniques for estimating SIR rely on a correlation function as shown by the expressions below. First, assume the output symbol at the receiver for the control signal Sc is:

$$y(t)=Sc(t)+n(t), \text{ where t is a symbol index.}$$

At the receiver, the control signal power $E[Sc^2]$ is determined based on correlation function as follows:

$$\begin{aligned}
E[Sc^2] &\sim = y(t) * y(t-1) \\
&= [Sc(t)+n(t)] * [Sc(t-1)+n(t-1)] \\
&= Sc(t)Sc(t-1) + \{Sc(t)n(t-1) + Sc(t-1)n(t) + n(t)n(t-1)\} \\
&= Sc(t)Sc(t-1) + o_c(Sc, n) \\
&\to Sc^2
\end{aligned}$$

where $o_c(Sc, n)$ is called a correlation remainder.

The receiver determines the noise power $E[n^2]$ according to the following expression:

$$\begin{aligned}
E[n^2] &\sim = y(t)^2 - y(t)y(t-1) \\
&= [Sc(t)+n(t)]^2 - [Sc^2 + o_c(Sc, n)] \\
&= [Sc(t)^2 + n(t)^2 + 2Sc(t)n(t)] - [Sc^2 + o_c(Sc, n)] \\
&= n(t)^2 + o_n(Sc, n) \\
&\to n^2
\end{aligned}$$

where $o_n(Sc, n)$ is also called correlation remainder.

These measurements include both signal power and cross-finger interference power, which may be represented as:

$$E_k(Sc(t)^2) = E_k Sc + Ecross2\_k, \text{ where k represents a finger index}$$

$$E_k[n(t)^2] = E_k n + Ecross1\_k$$

where $E_k(Sc(t)^2)$ is the received control signal power, $E_k Sc$ represents the portion of the received control signal power due to the sent control signal, Ecross2_k represents the portion of the control signal power due to the cross-finger interference, $E_k[n(t)^2]$ is the received noise power, $E_k n$ represents the portion of the received noise power due to the additive channel noise, and Ecross1_k represents the portion of the received noise power due to the cross-finger interference. In view of the above, the SIR may be expressed as:

$$SIR = \sum_{k}^{fingers} \frac{E_k[Sc(t)^2]}{E_k[n(t)^2]}$$

$$= \sum_{k}^{fingers} \frac{E_k Sc + E_{cross2\_k}}{E_k n + E_{cross1\_k}}$$

Both the signal power and noise power estimation output contain cross-finger interference since the cross-finger interference exists in the input of the correlation function, or output of DPCCH despreader. In a High Speed Uplink Packet Access (HSUPA) environment, the cross-finger interference could be much stronger than noise power:

$$E_{cross1\_k} >> E_k[n(t)^2]$$

This causes SIR measurements to have a huge random offset, and significantly downgrades throughput.

SUMMARY OF THE INVENTION

At least some example embodiments relate to a method of determining a signal-to-noise ratio in a wireless network.

In one embodiment, the method includes despreading the received signals by applying an unused channelization code, determining noise power based on output of the despreading, and determining a signal-to-noise ratio, SIR, based on the noise power and at least one of the received signals.

In one embodiment, the method further includes canceling the noise power from power of the at least one of the received signals to produce a modified received signal power. Here, the SIR is determined based on the noise power and the modified received signal power.

In one embodiment, the despreading, the determining noise power and the canceling are performed for a plurality of fingers of a receiver.

In one embodiment, the determining a SIR includes determining an estimated noise power for each of the plurality of fingers based on the noise power determined for each of the plurality of fingers and a total antenna power for each of the plurality of fingers, and determining a SIR based on the estimated noise powers for each of the fingers and the modified received signal power for each of the plurality of fingers.

In one embodiment, the noise power includes power from noise and cross-finger interference, and the estimated noise power includes power from the noise but not from the cross-finger interference.

In one embodiment, the determining an estimated noise power determines the estimated noise power, for a particular finger from the plurality of fingers, by subtracting a first sum from a second sum. The first sum is a sum of the total antenna power for each of the plurality of fingers except the particular finger. The second sum is a sum of the noise power determined for each of the plurality of fingers.

In one embodiment, the determining an estimated noise power determines the estimated noise power, for a particular finger from the plurality of fingers, by subtracting a first sum from the total antenna power for the particular finger. The first sum is a sum of signal powers for signals received by the particular finger.

In one embodiment, determining a SIR includes determining, for each of the plurality of fingers, a finger SIR based on the modified received signal power for the finger and the estimated noise power for the finger; and adding the finger SIRs for the plurality of fingers.

In one embodiment, the method further includes performing uplink power control based on the determined SIR.

Another embodiment of the method includes determining a noise power for each of a plurality of fingers, determining at least one signal power associated with each of the plurality of fingers, and estimating a noise power at each of the plurality of fingers based on the noise power determined for each of the plurality of fingers and a total antenna power for each of the plurality of fingers. A signal-to-noise ratio, SIR, is determined based on the estimated noise powers for the plurality of fingers and the determined signal powers associated with the plurality of fingers.

In one embodiment, the noise power includes power from noise and cross-finger interference, and the estimated noise power includes power from the noise but not from the cross-finger interference.

In one embodiment, the determining an estimated noise power determines the estimated noise power, for a particular finger from the plurality of fingers, by subtracting a first sum from a second sum. The first sum is a sum of the total antenna power for each of the plurality of fingers except the particular finger, and the second sum is a sum of the noise power determined for each of the plurality of fingers.

In one embodiment, the method further includes canceling, for each finger, the noise power from the determined signal power to produce a modified signal power. Here, the finger SIR is determined based on the modified signal power for the finger and the estimated noise power for the finger.

In one embodiment, the determining an estimated noise power determines the estimated noise power, for a particular finger from the plurality of fingers, by subtracting a first sum from the total antenna power for the particular finger. The first sum is a sum of signal powers for signals received by the particular finger.

In one embodiment, the determining a SIR includes determining, for each of the plurality of fingers, a finger SIR based on the modified received signal power for the finger and the estimated noise power for the finger; and adding the finger SIRs for the plurality of fingers.

In one embodiment, the method further includes performing uplink power control based on the determined SIR.

At least some embodiment relate to a receiver.

In one embodiment, the receiver includes a plurality of fingers and an SIR generator. Each finger is configured to despread received signals by applying an unused channelization code, and is configured to determine a noise power based on output of the despreading. The SIR generator is configured to generate a SIR based on the noise powers and at least one of the received signals.

In another embodiment, the receiver includes a plurality of fingers and an SIR generator. Each finger is configured to determine a noise power and an associated signal power. The SIR generator is configured to estimate a noise power at each of the plurality of fingers based on the noise power determined for each of the plurality of fingers and a total antenna power received by each of the plurality of fingers, and is configured to determine a SIR based on the estimated noise powers for the plurality of fingers and the signal powers associated with the plurality of fingers.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the example embodiments and wherein.

DETAILED DESCRIPTION OF THE EMBODIMENTS

Figure 1:
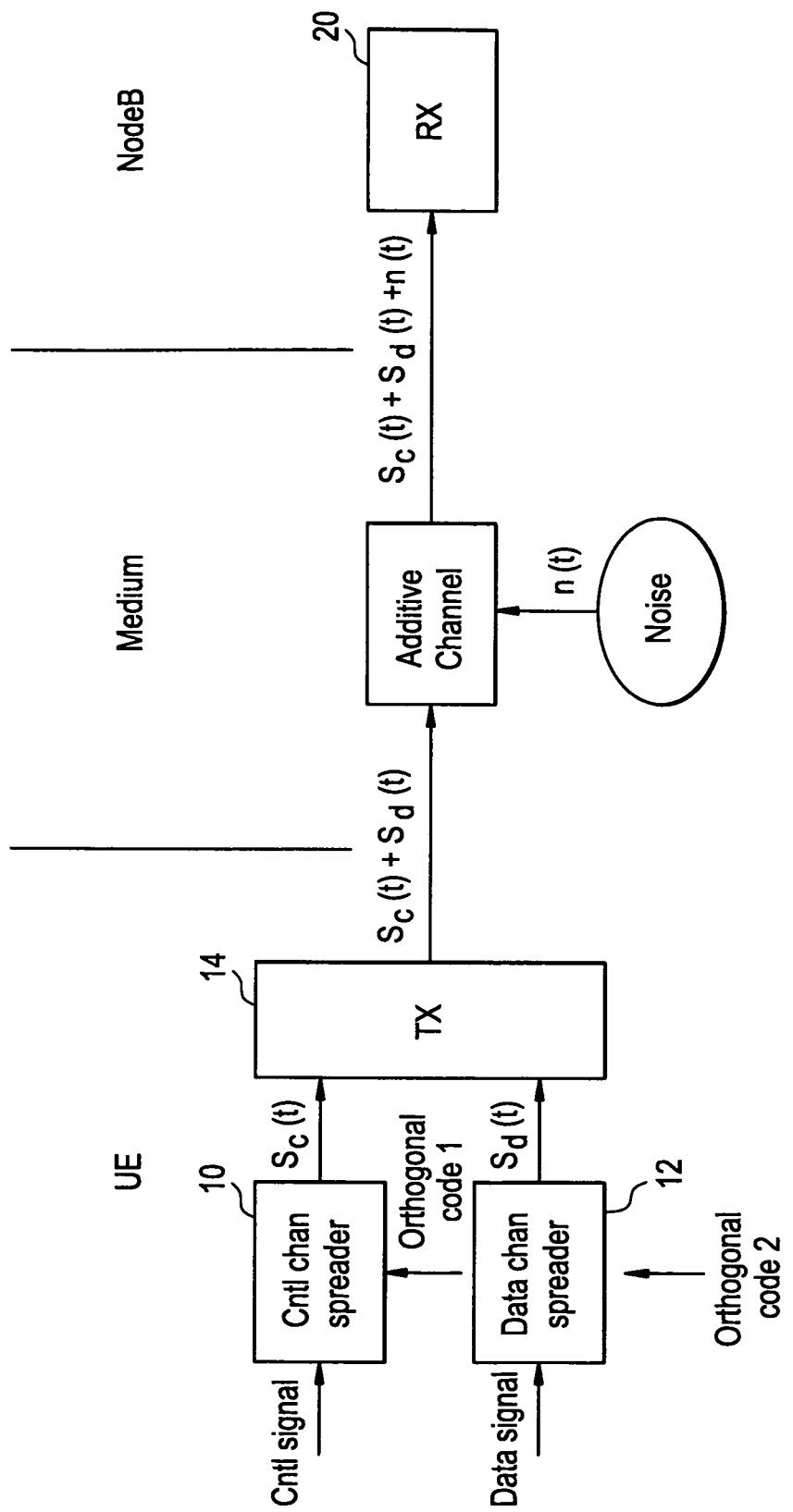
FIG. 1 illustrates a channel model for a WCDMA system.

Detailed illustrative embodiments are disclosed herein. However, specific structural and functional details disclosed herein are merely representative for purposes of describing example embodiments. An embodiment may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Exemplary embodiments are discussed herein as being implemented in a suitable computing environment. Although not required, exemplary embodiments will be described in the general context of computer-executable instructions, such as sections, program modules or functional processes, being executed by one or more computer processors or CPUs. Generally, sections, program modules or functional processes include routines, programs, objects, components, data structures, etc. that performs particular tasks or implement particular abstract data types. The sections, program modules and functional processes discussed herein may be implemented using existing hardware in existing communication networks. For example, sections, program modules and functional processes discussed herein may be implemented using existing hardware at existing network elements, servers or control nodes. Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "user equipment (UE)" may be considered synonymous to, and may hereafter be occasionally referred to, as a mobile, mobile unit, mobile station, mobile user, access terminal (AT), subscriber, user, remote station, receiver, etc., and may describe a remote user of wireless resources in a wireless communication network. The term "base station (BS)" may be considered synonymous to and/or referred to as a base transceiver station (BTS), NodeB, access node (AN), eNodeB, etc. and may describe equipment that provides data and/or voice connectivity between a network and one or more users.

As is well-known in the art, each of the user equipment and the base station may have transmission and reception capabilities. Transmission from the base station to the UE is referred to as downlink or forward link communication. Transmission from the UE to the base station is referred to as uplink or reverse link communication.

According to at least some example embodiments, instead of using a correlation function, the receiver creates a new virtual noise channel by despreading received signals using an unused channelization code. This noise channelization code has not been used in transmission by the user equipment (UE) transmitter and may be thought of, therefore, as a virtual noise channel. For example, the channelization code may be from the orthogonal channel code set defined by the standard. Therefore, this noise channelization code is orthogonal to all user control and data channels. Since the UE transmitter never physically sends out a signal with the noise channelization code, the receiver noise channel output will not include any user channel signals, and therefore, represents the channel noise. However, this channel noise may include cross-finger interference. According to at least one embodiment, a noise power estimation having the cross-finger interference cancelled there from is determined in real time from the channel noise. Based on this noise power estimation, the SIR may also be determined in real time.

Figure 2:
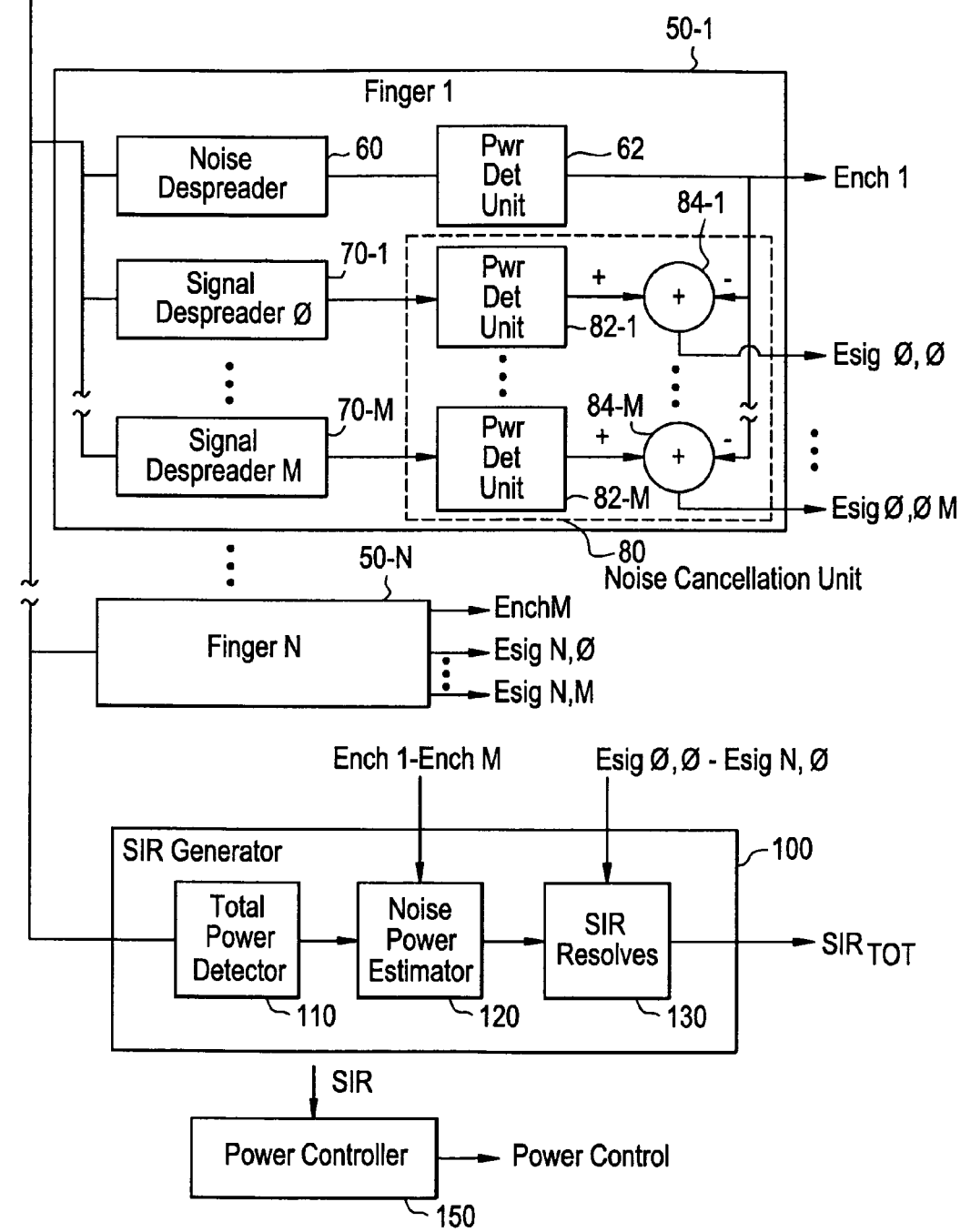
FIG. 2 illustrates a portion of an uplink receiver for determining signal-to-noise ratio (SIR) in a WCDMA system according to an embodiment.

FIG. 2 illustrates a portion of an uplink receiver for determining signal-to-noise ratio (SIR) in a WCDMA system according to an embodiment. For example, the uplink receiver may form part of a NodeB or base station. FIG. 2 illustrates a plurality of fingers 50-1 to 50-N that each receive the signals received by an antenna 52. While each finger 50 may have different timings associated with different multi-paths, the structure of each finger 50 may be the same. Accordingly, only the structure of finger 50-1 is illustrated and will be described for the sake of brevity.

As shown, a noise despreader 60 receives signals received by the antenna 52. The noise despreader 60 applies an unused orthogonal channel code to the received signals. The orthogonal code may be any well-known orthogonal code such as a Walsh code, etc. As mentioned above, various standards may provide a set of orthogonal codes. The noise despreader 60 selects a code from this set that is not used in transmitting the signals received at the antenna 52. Accordingly, output from the first despreader will be just the noise. There is no correlation remainder $o_n(Sc, n)$. A noise power determining unit 62 determines the power of the noise signal $E_{nch}$ on a symbol-by-symbol basis. For example, the noise power determining unit 62 may square the noise signal output from the noise despreader 60.

The finger 50 also includes first-Mth signal despreaders 70-1 to 70-M using respective orthogonal codes to each despread a respective signal such as a control signal or a data signal, respectively. A noise cancellation unit 80 receives the noise power and the signals output by the signal despreaders 70. The noise cancellation unit 80 includes power determining units 82-1 to 82-M, each determining the power of a signal output by a respective signal despreader 70 on a symbol-by-symbol basis. For example, in one embodiment, the power determining units 82 may square the respective signal to obtain the signal power. The noise cancellation unit 80 also includes combiners 84-1 to 84-M. Each combiner subtracts the noise power output by the noise power determining unit 62 from the signal power output by an associated power determining unit 82 to cancel the noise power from the signal power and output a modified signal power Esig from which noise has been cancelled. In FIG. 2, $Esig_{i,j}$ represents the signal power for the jth signal in the ith finger. It should be noted that this noise power determination and cancellation works for any signal symbol without a need to know the signal bits. However, if the signal is known, like a pilot signal, the pilot symbols may be adjusted to line up on the same bits and accumulated. This is called coherent accumulation. The coherent accumulation may be squared to obtain a coherent power. Accordingly, the power determined units 62 may perform coherent or non-coherent power estimation based on whether the received signal is known.

As shown in FIG. 2, the uplink receiver further includes a SIR generator 100 that generates a SIR based on the signals produced by the fingers 50. In particular, the SIR generator 100 includes a total power detector 110, a noise power estimator 120, and a SIR resolver 130. The total power detector 110 determines the total antenna power for each finger. Namely, each finger is associated with a different arrival time (e.g., multipath). The total power detector 110 determines the total power received at the antenna 52 at the arrival time associated with a finger as the total antenna power of the finger. The total antenna power is determined on a symbol basis for each finger. Namely, the power over the total number of chips forming a symbol is determined as the total antenna power.

The noise power estimator 120 estimates a clean noise power associated with each finger based on the noise power for each finger and the total antenna power for each finger. As will be recalled, the noise power includes noise plus cross-finger interference. By contrast the estimated noise power provides an estimate of the noise power without the cross-finger interference. In particular, the noise power estimator 120 determines the estimated noise power according to the following expression:

$$E_{noise\_k} = E_{ant\_k} - \sum_{i=0}^{fingers} (E_{ant\_i} - E_{nch\_i})$$

where $E_{noise\_k}$ is the estimated noise power for the kth finger, $E_{ant\_k}$ is the total antenna power for the kth finger, and $E_{nch\_k}$ is the noise power from the power determining unit 62 for the kth finger. As this expression indicates, the estimated noise power for the kth finger is the (1) the sum of the total antenna power for all the fingers except the kth finger subtracted from (2) the sum of the noise power $E_{nch}$ determined for all the fingers.

The SIR resolver 130 receives the estimated noise power for each finger and the modified signal power for a signal of interest from each finger. For example, in WCDMA, the signal of interest may by the DPCCH. The SIR resolver 130 determines the SIR of each finger. For example, using the DPCCH as an example, the finger SIR for the kth finger is determined according to the following expression:

$$SIR_k = E_{DPCCH\_k}/E_{noise\_k}.$$

where $E_{DPCCH\_k}$ is the signal power of the DPCCH for the kth finger. The SIR resolver 130 sums the finger SIRs to determine a total $SIR_{tot}$ as the output SIR.

FIG. 2 further shows that the receiver of the NodeB includes a power controller 150. The power controller 150 performs power control in any well-known manner except that the measured or detected SIR used in the power control operation is the $SIR_{tot}$ output from the SIR generator 100.

Figure 3:
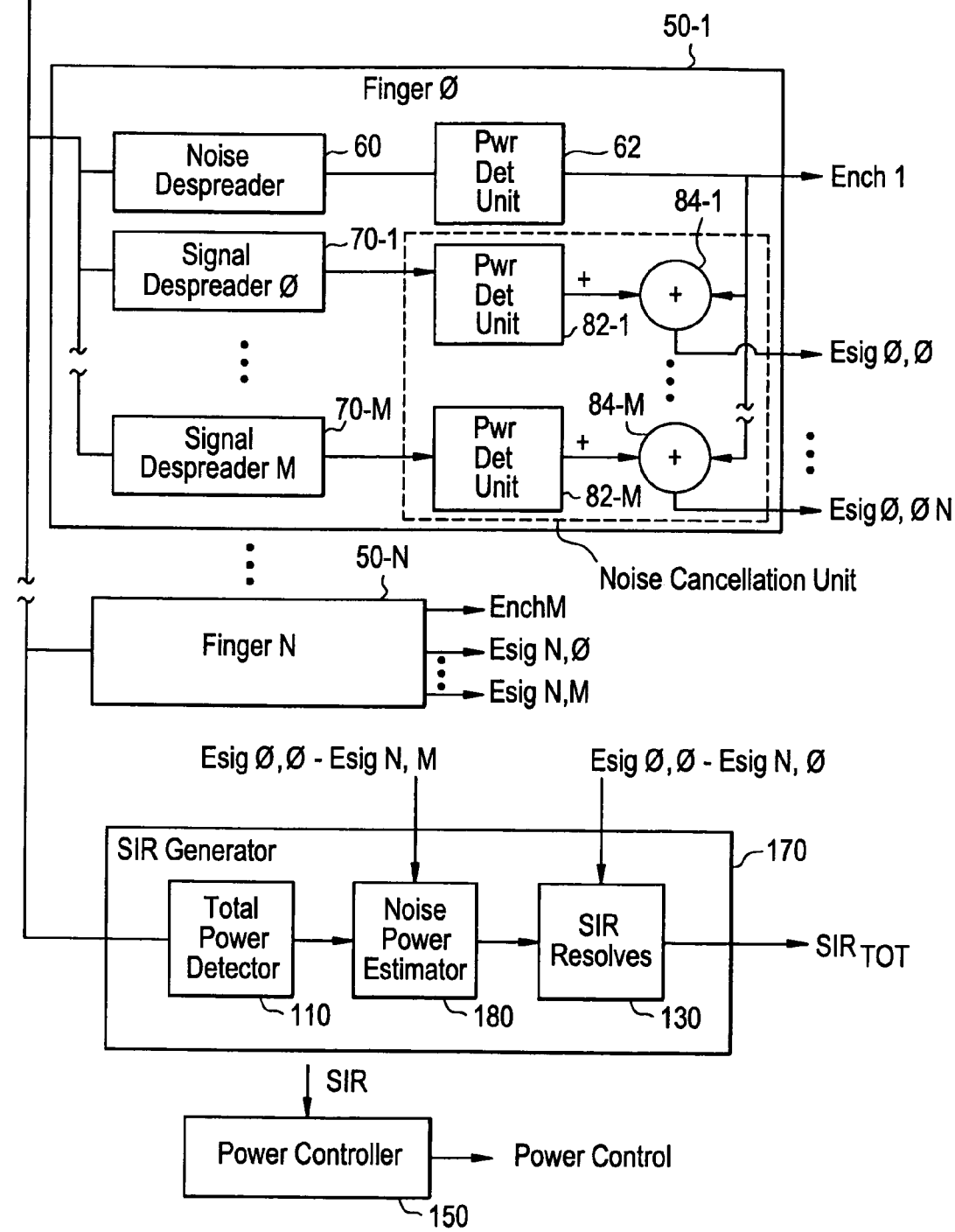
FIG. 3 illustrates a portion of an uplink receiver for determining signal-to-noise ratio (SIR) in a WCDMA system according to another embodiment.

FIG. 3 illustrates a portion of an uplink receiver for determining signal-to-noise ratio (SIR) in a WCDMA system according to another embodiment. For example, the uplink receiver may form part of a NodeB or base station. The embodiment of FIG. 3 is the same as the embodiment of FIG. 2 except that the SIR generator 100 of FIG. 2 has been replaced with a SIR generator 170 in FIG. 3. Accordingly, for the sake of brevity, only these differences will be described.

The SIR generator 170 in FIG. 3 is the same as the SIR generator 100 in FIG. 2 except that the noise power estimator 120 of FIG. 2 has been replaced with a noise power estimator 180 in FIG. 3. Accordingly, for the sake of brevity, only these differences will be described.

The noise power estimator 180 receives the total antenna powers from the total power detector 110. The noise power estimator 180 also receives all of the uplink signal powers $Esig_{i,j}$ after noise cancellation. For each finger k, the noise power estimator 180 determines the estimated noise power $E_{noise\_k}$ according to the expression below:

$$E_{noise\_k} = E_{ant\_k} - \sum_{i=0}^{alluplinkchannels} (Esigk, i)$$

Accordingly, the sum of the signal powers for a finger are subtracted from the total antenna power for the finger to determine the estimated noise power for the finger.

The SIR resolver 130 receives the estimated noise powers for the fingers and determines the finger SIR and total $SIR_{tot}$ as described above with respect to FIG. 2. Furthermore, the power controller 150 may perform power control based on this total $SIR_{tot}$ as described above with respect to FIG. 2.

In wireless communication systems such as a WCDMA system, there are many signal processing operations in addition to power control that rely on accurate noise power, signal power, and/or SIR estimation. Accordingly, the noise power, signal power and/or SIR generated according to the above embodiments may be used in any of these well-known operations. For example, DTX detection may be performed in the same manner as described in U.S. Pat. No. 7,782,820, the entire contents of which are hereby incorporated by reference, except that the noise power, signal power and/or the determined SIR may be replaced with those determined according to any of the above embodiments.

The invention being thus described, it will be obvious that the same may be varied in many ways. For example, while the embodiments were described as applied to a WCDMA system, the invention is not limited to WCDMA. Also, while described a applied to the uplink, the embodiments may also be applied to the downlink. Such variations are not to be regarded as a departure from the invention, and all such modifications are intended to be included within the scope of the invention.

We claim:

1. A method of determining a signal-to-noise ratio in a wireless network, comprising:
    despreading the received signals by applying an unused channelization code;
    determining noise power based on output of the despreading;
    cancelling the noise power from power of at least one of the received signals to produce at least a modified received signal power; and
    determining, by a processor, a signal-to-noise ratio, SIR, based on the noise power and the modified received signal power, wherein
        the despreading, the determining noise power and the canceling are performed for a plurality of fingers of a receiver, and
        the determining a SIR includes,
            determining an estimated noise power for each of the plurality of fingers based on the noise power determined for each of the plurality of fingers and a total antenna power for each of the plurality of fingers, and
            determining a SIR based on the estimated noise powers for each of the fingers and the modified received signal power for each of the plurality of fingers.

2. The method of claim 1, wherein the noise power includes power from noise and cross-finger interference, and the estimated noise power includes power from the noise but not from the cross-finger interference.

3. The method of claim 1, wherein the determining an estimated noise power determines the estimated noise power, for a particular finger from the plurality of fingers, by subtracting a first sum from a second sum, the first sum is a sum of the total antenna power for each of the plurality of fingers except the particular finger, and the second sum is a sum of the noise power determined for each of the plurality of fingers.

4. The method of claim 2, wherein the determining a SIR comprises:
    determining, for each of the plurality of fingers, a finger SIR based on the modified received signal power for the finger and the estimated noise power for the finger; and
    adding the finger SIRs for the plurality of fingers.

5. The method of claim 1, wherein the determining an estimated noise power determines the estimated noise power, for a particular finger from the plurality of fingers, by subtracting a first sum from the total antenna power for the particular finger, and the first sum is a sum of signal powers for signals received by the particular finger.

6. The method of claim 5, wherein the determining a SIR comprises:
    determining, for each of the plurality of fingers, a finger SIR based on the modified received signal power for the finger and the estimated noise power for the finger; and
    adding the finger SIRs for the plurality of fingers.

7. The method of claim 1, wherein the determining a SIR comprises:
    determining, for each of the plurality of fingers, a finger SIR based on the modified received signal power for the finger and the estimated noise power for the finger; and
    adding the finger SIRs for the plurality of fingers.

8. The method of claim 2, further comprising:
    performing uplink power control based on the determined SIR.

9. The method of claim 1, further comprising:
    performing uplink power control based on the determined SIR.

10. The method of claim 8, further comprising:
    performing uplink power control based on the determined SIR.

11. A receiver, comprising:
    a plurality of fingers, each finger being configured to,
        despread received signals by applying an unused channelization code,
        determine a noise power based on output of the despreading,
        cancel the noise power from power of at least one of the received signals to produce at least a modified received signal power; and
    a signal-to-noise ratio, SIR, generator configured to generate a SIR based on the noise powers and the modified received signal powers, wherein the SIR generator is configured to,
        determine an estimated noise power for each of the plurality of fingers based on the noise power determined for each of the plurality of fingers and a total antenna power for each of the plurality of fingers, and
        generate the SIR based on the estimated noise powers for each of the fingers and the modified received signal power for each of the plurality of fingers.

* * * * *